March 16, 1943. V. R. ABRAMS 2,314,264
SHAVING APPARATUS
Filed May 3, 1941
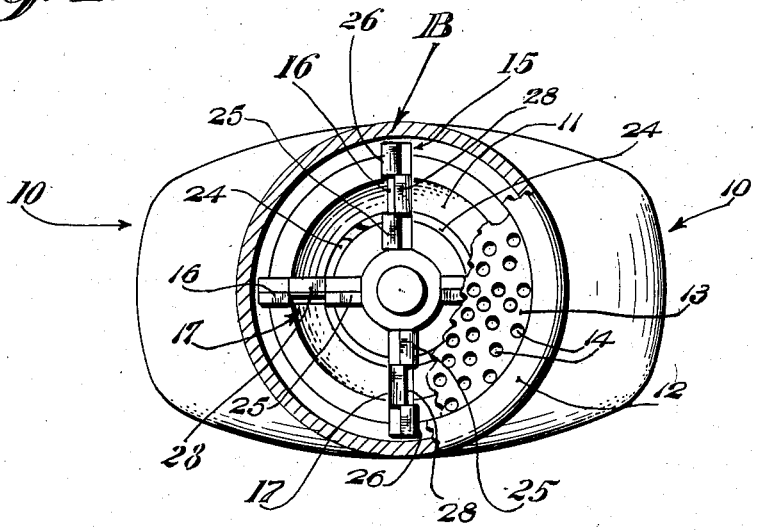
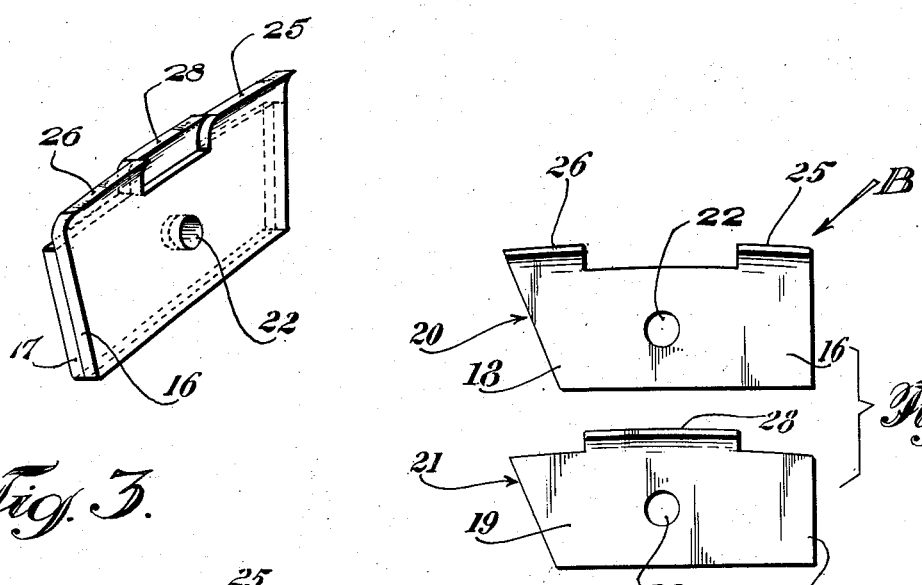
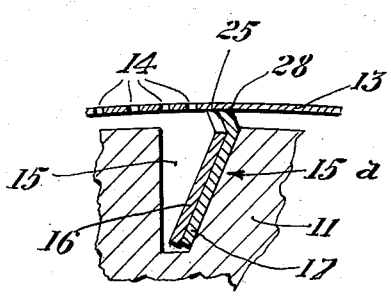
INVENTOR.
Victor R. Abrams
BY
Hogart, Leery & Campbell Patented Mar. 16, 1943

2,314,264

UNITED STATES PATENT OFFICE 2,314,264

SHAVING APPARATUS

Victor R. Abrams, Maplewood, N. J., assignor to The Roto Shaver, Inc., New York, N. Y., a corporation of Connecticut Application May 3, 1941, Serial No. 391,622

5 Claims. (Cl. 30—43)

This invention relates to improvements in shaving devices and relates more particularly to novel forms of blades for dry shaving devices of the type including a perforated shear plate formed as at least a part of a surface of revolution and a motor driven cutting member disposed behind the shear plate to sever hairs projected therethrough.

Shaving devices of the type described generally above, in order to shave closely, must have an extremely thin shear plate which inherently is flexible unless it is reinforced at closely spaced intervals. The reinforcements are undesirable for the reason that they decrease the effective shearing area and, moreover, materially increase the cost of production of the shear plates.

Flexibility of the shear plate, in itself, is not undesirable, but it does indirectly effect the efficiency of the device. For example, when the shear plate is flexed slightly out of its normal shape, it tends to cause unequal contact between the blade and the shear plate. Normally, the contacting surface of the shear plate and the blade conform closely in contour and any departure from the normal shape of the shear plate causes the major portion of the blade to move out of engagement with the shear plate.

In accordance with the present invention, a blade is provided which reduces to a minimum the loss of contact with the shear plate when the shear plate is flexed by pressure exerted thereon. More particularly, blades of the type embodying the invention are formed with two or more relatively movable shearing or cutting edge portions which permit one or more of the edge portions to be deflected by bending of the shear plate without loss of contact between the remaining shearing edge portions and the shear plate.

For a better understanding of the present invention, reference may be had to the accompanying drawing in which:

Figure 1 is a top plan view of a typical form of shaving device embodying the present invention with the shear plate partly broken away in order to disclose details of the blade construction;

Figure 2 is a view in side elevation of a typical form of composite blade embodying the invention with the blade elements separated to show their construction;

Figure 3 is a perspective view of the assembled blade; and

Figure 4 is a view in vertical section taken through one of the blade members and a portion of the blade supporting member.

Blades of the type embodying the present invention are, for purposes of illustration, disclosed as applied to the form of dry shaving device disclosed in the Moscovics and Abrams application Serial No. 210,682, filed May 28, 1938, patented April 15, 1941, No. 2,238,278. It will be understood of course, that the blades may be used in types of dry shaving devices other than that disclosed herein.

As shown in Figure 1, a typical form of dry shaving device in which the blades may be used consists of a handle 10 in which is mounted a motor (not shown) for rotating a generally disc shaped blade supporting member 11. Supported on the handle 10 and overlying the blade supporting member 11 is a cap member 12 having a dome-shaped shear plate 13 which is provided with a great number of relatively small perforations 14.

The blade supporting member 11 is provided with a plurality of substantially radially directed slots 15 for receiving the blade members B. The blade members B are loosely mounted in the slots so that they can move axially of the blade supporting member 11 and to a limited extent substantially radially of the blade supporting member.

As shown in Figures 2 and 3, the blades B may be formed of two or more blade members 16 and 17 which are characterized by generally flat body portions 18 and 19 having inclined end portions 20 and 21 for cooperation with an inclined cam surface (not shown) in the blade supporting member 11 which tend to force the blades into engagement with the undersurface of the shear plate 13 by centrifugal force. The blade members 16 and 17 are also provided with generally centrally disposed apertures 22 and 23 which receive a spring ring 24 (Figure 1) for retaining them in the blade supporting member 11 with capacity for relative movement.

The blade member 16, as shown in Figure 2, is provided with two spaced longitudinally curved shearing edge portions 25 and 26 which are formed by bending the upper edge of the blade member 16 laterally out of the plane of the body 18 and honing or grinding to a sharp cutting edge.

The blade member 17 is provided with a single longitudinally curved cutting edge portion 28 which is similarly formed and is of a length substantially equal to or slightly more than the distance between the adjacent ends of the cutting edge portions 25 and 26 on the blade member 16. Moreover, the length of the cutting edge portion 28 is substantially equal to the combined lengths of the cutting edge portions 25 and 26 in order to equalize the pressures of the blades against the shear plate.

As shown in Figures 1 and 3, the blade members 16 and 17 may be placed in the slot 15 of the blade support 11 in face to face contact with the cutting edge portion 28 between the cutting edge portions 25 and 26 so as to form a substantially continuous curved cutting edge conforming to the curvature of the undersurface of the shear plate 13.

The slot 15 has an inclined back wall 15a against which the blade members 16 and 17 rest during operation of the device. As shown particularly in Figure 4, the inclination of the wall 15a permits the rear blade member 17 to be displaced slightly with relation to the blade member 16 so that the cutting edge portion 28 does not project between the cutting edges 25 and 26. For this reason the ends of the cutting edge portion 28 may overlap the ends of the cutting edge portions 25 and 26 without jamming.

Inasmuch as the blade members 16 and 17 are loosely supported in the slot 15 they are capable of relative movement with respect to each other and with respect to the blade support 11. Therefore, upon rotation of the blade support, the cutting edge portions 25, 26 and 28 will be forced against the inner surface of the shear plate 13 and will maintain intimate contact therewith. If, however, the shear plate 13 should flex at some point because of pressure exerted thereon, that blade portion which contacts the flexed zone of the shear plate 13 will be deflected with the shear plate, while maintaining contact therewith, but will not effect contact between the cutting edge portions on the other blade element. In this manner, at best only one section of the blades will lose contact with the shear plate.

It will be understood that the blade member 16 may be provided with more than two cutting edge portions and that under these circumstances the blade portion 17 will have more than one cutting edge portion disposed in such positions along its length as to fit between the various cutting edge portions of the blade member 16. Similarly, more than two blade members may be provided, if desired, so as to decrease the area of the zone of cutting which is effected by flexing of the shear plate.

From the preceding disclosure it will be apparent that a simple blade construction is provided which effectively increases the efficiency of dry shaving devices by at all times maintaining a larger effective cutting area than was possible with prior types of devices.

It will be understood, of course, that blades of the type embodying the present invention are susceptible to considerable variation in shape and size depending entirely upon the type of shaving device in which they are used and that the form of the invention disclosed herein is therefore illustrative only and should not be considered as limiting the scope of the following claims.

I claim:

1. In a dry shaving device having a perforated shear plate, a blade support movable relatively to said shear plate and means on said blade support for receiving blades therein, the combination with said blade support of a blade having a body portion receivable in said means, a cutting edge directed laterally from one edge of said body portion, said cutting edge comprising a plurality of sections movable relatively to each other in the plane of said body portion.

2. In a dry shaving device having a perforated shear plate, a blade support movable relatively to said shear plate and means on said blade support for receiving blades therein, the combination of a plurality of blade elements each having a body portion and a cutting edge portion projecting laterally from one edge of said body portion, the length of said cutting edge portion being less than the length of said body portion and being differently offset along the respective body portions whereby when said body portions are superimposed, the cutting edge portions are in substantially end to end relationship.

3. In a dry shaving device having a perforated shear plate, a blade support movable relatively to said shear plate and means on said blade support for receiving blades therein, the combination of a plurality of blade elements each having a body portion and at least one laterally projecting cutting edge portion, said cutting edge portions being differently offset along the respective body portions whereby when said body portions register side to side, said cutting edge portions are in substantially end to end relationship.

4. In a shaving device, the combination of a rotary blade support having at least one substantially radially directed slot therein, a plurality of relatively movable blade elements movably mounted in said slot, each blade element having a cutting edge portion of less length than said slot projecting in the direction of movement of said blade support, and said cutting edge portions being disposed in substantially end to end relationship.

5. In a composite blade for a dry shaving device, the combination of a plurality of blade members, each having a body portion and at least one cutting edge portion projecting laterally from one edge of the body portion, said cutting edge portions being disposed at such intervals along the edges of said body members that a space between the cutting edge portions on one blade member is complemental in length and position to a cutting edge portion on another blade element.

VICTOR R. ABRAMS.